(12) United States Patent
Berger et al.

(10) Patent No.: US 6,252,503 B1
(45) Date of Patent: Jun. 26, 2001

(54) METHOD OF MONITORING A SENSOR DEVICE AND SENSOR DEVICE AND ANALYSIS UNIT WITH MONITORING MEANS

(75) Inventors: Joachim Berger, Winterbach; Rene Schenk, Tamm; Juergen Biester, Boeblingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/523,501

(22) Filed: Mar. 10, 2000

(30) Foreign Application Priority Data

Mar. 16, 1999 (DE) .............................................. 199 11 526

(51) Int. Cl.$^7$ .................................................. G08B 29/00
(52) U.S. Cl. .......................... 340/514; 340/506; 340/511; 340/310.06
(58) Field of Search .................................. 340/506, 511, 340/514, 538, 310.01, 310.06

(56) References Cited

U.S. PATENT DOCUMENTS 4,962,368 * 10/1990 Dobrzanski et al. ................ 340/514

FOREIGN PATENT DOCUMENTS 28 05 876     8/1979   (DE) .
0 635 135 B1   10/1996   (EP) .

* cited by examiner

*Primary Examiner*—Daryl Pope
(74) *Attorney, Agent, or Firm*—Michael J. Striker

(57) ABSTRACT

In the method for monitoring the sensor device (1), which supplies an analog output signal over a bidirectional output line (3) to an analysis unit (2) for evaluation, a predetermined test signal is applied to a sensor output in a monitoring phase, which is received in the analysis unit (2) and evaluated. In order to initiate the monitoring phase at any arbitrary time without the need of an additional connecting line between the sensor device and the analysis unit, a trigger signal of a predetermined trigger level is transmitted by the analysis unit (2) to the sensor device (1) over the output line (3) and is detected in the sensor device, which generates the predetermined test signal and transmits it to the analysis unit (2) over the bidirectional connecting line (3). A sensor device and connected analysis unit designed to perform this method are also described.

6 Claims, 1 Drawing Sheet

METHOD OF MONITORING A SENSOR DEVICE AND SENSOR DEVICE AND ANALYSIS UNIT WITH MONITORING MEANS

BACKGROUND OF THE INVENTION

1. Field of the Invention

The present invention relates to a method for monitoring a sensor device, which provides an analog output signal on an output line, which is fed to an test signal is applied to the sensor output in a monitoring phase and is received and evaluated in the analysis unit. The invention also relates to the sensor device and an analysis unit with monitoring means suitable for performing the method of the invention.

2. Prior Art

Analog sensors, such as pressure sensors, are generally connected with three lines to an analysis and control unit. Two of the lines are for supplying electrical power to the sensor electronics and one line is for output of an electrical sensor signal. This sensor signal is usually effected by fluctuations of the power supply, so that the analysis circuits are frequently ratiometric. The output voltage of the sensor is then related to the power supply voltage, since the power supply voltage is superimposed as an output voltage shift or offset of the output signal. The analog/digital converter in the analysis unit uses this same power supply voltage for further processing or reading of the output voltage. In this way power supply fluctuations are not present in the measurement result and the reference voltage does not need to have a predetermined value that is within narrow tolerances.

However this method is only satisfactory, when the reference potential of the analog/digital converter is compatible with the output voltage shift. In practice however a voltage drop results because of the supply line, interface and electrical components based on unavoidable transmission impedance, which changes the output voltage shift. Because of those effects measurement errors result. If the transmission impedance remains time invariant or constant, this measurement error may be eliminated by an initial calibration. When the transmission impedance wanders or fluctuates with time (e.g. for example because of temperature dependence), the calibration process should be repeated from time to time.

Most existing sensor devices have monitoring circuitry for testing for possible short circuits or line interruptions. A "signal-range-checking" method for displacement sensors is described in DE 28 05 876 A1. These displacement sensors produce output signals with amplitudes in a predetermined amplitude range, which depend on a measured displacement. A threshold value switch is used to determine if the amplitude exceeds the predetermined amplitude range and transmits an error signal to the analysis unit in the case of a fault.

EP 0 635 135 B1 describes a method of monitoring a rotation speed measuring device with at least two rotation speed sensors. In this method a test pulse is fed to one of the rotation speed sensors from the microprocessor acting as the analysis unit over a special test line during a testing phase. The level of the other rotation speed sensor is then monitored. A short circuit is detected by a level change of the other rotation speed sensor.

In other existing test methods a definite operating state is produced (e.g. the pressure of the medium to be measured by a pressure sensor is reduced to zero pressure) and then the offset of the output signal is measured. This type of test however only tests the output signal range corresponding to the definite operating state and also is not useable in all sensors.

Sensors are also known that perform an initialization test after the operating voltage has been applied to them. In this initialization test, e.g., half the power supply voltage is applied to the sensor output, whereby the dependence of the output signal on the power supply voltage, especially in ratiometric sensors, can be established.

It has proven especially disadvantageous that the known monitoring methods can only detected gross faults, such as short circuits and line interruptions, or that the tested operating range is too small. Thus it is desirable to be able to start the testing phase not only when the sensor device is turned on, but at any arbitrary time point. Otherwise the initialization test time of the sensor adds to the initialization time of the analysis unit, which leads to an undesirable delay prior to operational readiness.

SUMMARY OF THE INVENTION

It is an object of the present invention to provide a method of monitoring a sensor device, which permits an evaluation of the sensor device output signals according to one or more predetermined test signals at any arbitrary time, and in which the apparatus expenses are kept to a minimum.

It is another object of the invention to provide a sensor device and an analysis unit with an economical monitoring means for performing this method of monitoring at any arbitrary time.

According to the invention, these objects and others, which will be made more apparent hereinafter, are attained, by a method of monitoring a sensor device, which supplies an analog output signal over an output line to an analysis unit for evaluation. This method comprises the steps of:

a) generating a trigger signal of a predetermined trigger level in the analysis unit and applying the trigger signal to the sensor device over the output line; and b) detecting the trigger signal of the predetermined trigger level in the sensor device and starting a monitoring phase in the sensor device in response to the trigger signal of the predetermined trigger level; and c) when the trigger signal of the predetermined trigger level is detected in the sensor device, producing at least one predetermined test signal at a sensor output during the monitoring phase.

The sensor device and connected analysis unit according to the invention include monitoring means comprising a controllable switching means in the analysis unit, which applies a trigger signal of a predetermined trigger level to a sensor output of the sensor device at a predetermined time; a comparator circuit in the sensor device, which is connected in parallel to the sensor output; and a test unit in the sensor device, which is connected to the comparator circuit and the sensor output, whereby the comparator circuit activates the test unit to deliver a predetermined test signal to the sensor output and thus the analysis unit, when the comparator circuit detects the trigger signal of the predetermined trigger level at the sensor output.

The monitoring means according to the invention has the advantage that the output line of the sensor device is bidirectional, so that a separate test line is not required.

In the method according to the invention the trigger level should be outside of the level range of the sensor output signal. Since the current, which the sensor output supplies, is generally limited (e.g. with signal amplification by means of an operational amplifier) or must be limited, the output voltage of the sensor device can be at a predetermined value, approximately ground or positive supply voltage. This trigger level is then detected in the sensor device. Subsequently the test sequence is then activated at the output of the sensor device.

The analysis and switching circuit starts the test sequence at any arbitrary time by means of a simple controllable switch. This allows the sensor device to be prepared for use as rapidly as possible, since the sensor test can be performed at a suitable later time, especially during control unit re-testing.

Advantageously multistage test sequences, in which several test signals such as portions or fractions of the supply voltage are produced, e.g. by a voltage divider, are applied to the sensor output. The output voltage shift in ratiometric sensor means may thus be determined depending on the respective applied portions of the supply voltage.

The sensor device according to the invention with the bidirectional output line requires only minimal apparatus expense. A comparator circuit is connected with the sensor output, which produces an activating signal when it detects the trigger signal of the predetermined trigger level at the sensor output during the monitoring phase. Then the comparator circuit transmits the activating signal to a test unit, which generates the predetermined test signal in response to it. The test signal is then transmitted to the sensor output which is connected to the test unit and then to the analysis unit. The trigger signal is applied to the sensor output by a controllable switching means in the analysis unit, for example a transistor.

BRIEF DESCRIPTION OF THE DRAWING

The objects, features and advantages of the invention will now be illustrated in more detail with the aid of the following description of the preferred embodiments, with reference to the accompanying sole figure, which is a schematic circuit diagram of the sensor device and connected analysis unit including the fault monitoring means according to the invention.

DESCRIPTION OF THE PREFERRED EMBODIMENTS

Figure 1:
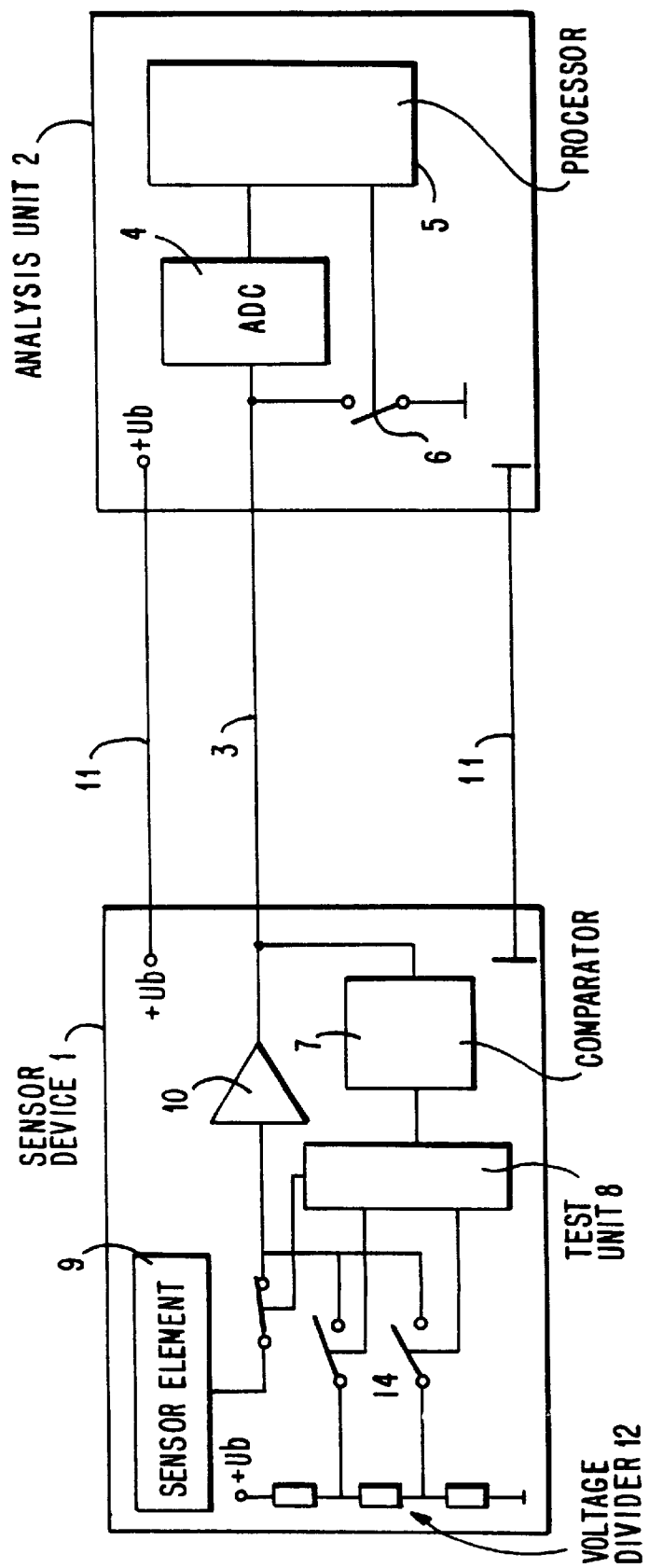

The sensor device 1 and the analysis and control unit 2 shown in FIG. 1 are connected with each other by three lines, namely two power supply lines 11 and a sensor output line 3. In this embodiment the ratiometric sensor device 1 is a rail pressure sensor for a common rail fuel injection device. An exact pressure measurement is required here, in order not to inject too little or too much fuel into the cylinder of the engine. Thus changes in the output voltage shift because of contact or transfer resistances in the power supply line must be detected, in order to be able to employ the correct reference voltage for the analog/digital converter 4. According to the invention processor 5 connected following the analog/digital converter 4 controls a transistor switch 6, which applies a trigger signal, for example a positive operating voltage, to the output line 3. Since the operational amplifier 10 connected following the sensor element 9 produces a limited output current, the comparator circuit 7 can detect this trigger signal, and then activate the test unit 8.

In the embodiment shown in the drawing portions of the supply voltage $U_b$ are applied to the sensor output one after the other in the monitoring phase by means of the voltage divider 12 and switches 15 under control of the test unit 8. The connection of the sensor element 9 with the sensor output O is interrupted when this occurs. The test signals switched to the sensor output O during this testing phase can be evaluated accordingly in the analysis unit 2. Whether or not a short circuit or a line break is present can then be determined in the analysis unit 2. Voltage drops of the power supply voltage superimposed on the output voltage and originating because of the contact or transfer resistances can also be determined.

Sensor monitoring is possible at any arbitrary time point and only little additional hardware expense is required.

The disclosure in German Patent Application 199 11 526.5 of Mar. 16, 1999 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method of monitoring a sensor device and a sensor device and a connected analysis unit with monitoring means, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

We claim:

1. A method of monitoring an analog sensor device, which supplies an analog output signal to an analysis unit for evaluation over a bidirectional output line connecting the analysis unit to the sensor device, said method comprising the steps of:

a) generating an analog trigger signal of a predetermined trigger level in the analysis unit (2) and feeding the analog trigger signal to the analog sensor device (1) over the bidirectional output line (3), said predetermined trigger level being outside a level range of said analog output signal;

b) detecting the analog trigger signal of the predetermined trigger level in the analog sensor device (1) and starting a monitoring phase in the analog sensor device in response to said analog trigger signal; and c) when the analog trigger signal of the predetermined trigger level is detected in the analog sensor device (1), producing at least one predetermined analog test signal in the sensor device during the monitoring phase and transferring the at least one predetermined analog test signal over the bidirectional output line (3) to the analysis unit (2) for analysis.

2. The method as defined in claim 1, wherein said at least one predetermined analog test signal consists of a plurality of analog test signal portions.

3. The method as defined in claim 2, wherein said analog test signal portions are provided by respective divisions of a supply voltage ($U_b$) of a power supply for said analog sensor device.

4. The method as defined in claim 1, wherein the starting of the monitoring phase occurs immediately after initialization of the analysis unit after said analog sensor device (1) is activated.

5. An analog sensor device (1) for generating an analog output signal and an analysis unit (2) connected with the analog sensor device by a bidirectional sensor output line (3) to receive and analyze said analog output signal, said analog sensor device (1) and said analysis unit (2) including monitoring means for sensor testing, said monitoring means comprising a controllable switching means (6) arranged in the analysis unit, said switching means comprising means for applying an analog trigger signal of a predetermined trigger level to a sensor output (O) of the analog sensor device at a predetermined time via the bidirectional sensor output line (3), said predetermined trigger level being outside a level range of said analog output signal;

a comparator circuit (7) in the analog sensor device (1), said comparator circuit being connected in parallel to the sensor output (O) and comprising means for detecting said analog trigger signal of the predetermined trigger level; and a test unit (8) in the sensor device (1), said analog sensor device (1) being connected to the comparator circuit (7) and the sensor output;

wherein the comparator circuit (7) generates an analog activating signal and transmits the analog activating signal to the test unit (8) to activate the test unit to produce and feed at least one predetermined analog test signal to the sensor output and hence to the analysis unit (2) over the bidirectional sensor output line (3), when the comparator circuit (7) detects the analog trigger signal of the predetermined trigger level at the sensor output.

6. The sensor device (1) and the analysis unit (2) as defined in claim 5, wherein said analog sensor device (1) includes a sensor element (9) connected with said sensor output (O) by means of an operational amplifier (10).

* * * * *